United States Patent [19]

Murray

[11] Patent Number: 4,523,666

[45] Date of Patent: Jun. 18, 1985

[54] BRAKE ROTOR WITH VIBRATION HARMONIC SUPPRESSION, AND METHOD OF MANUFACTURE

[75] Inventor: Scott L. Murray, Lansing, Mich.

[73] Assignee: Motor Wheel Corporation, Lansing, Mich.

[21] Appl. No.: 520,064

[22] Filed: Aug. 3, 1983

[51] Int. Cl.³ ............................................. F16D 65/10
[52] U.S. Cl. ....................... 188/218 XL; 29/156.8 R; 74/574; 181/209
[58] Field of Search ......... 188/218 XL, 218 A, 18 A, 188/264 AA, 264 A, 218 R; 152/209 R; 192/107 R; 74/574; 29/156.8 R, 156.4 R, 598; 181/209, 208

[56] References Cited

U.S. PATENT DOCUMENTS

| | | | |
|---|---|---|---|
| 3,298,476 | 1/1967 | Day | 188/218 A |
| 4,327,792 | 5/1982 | Landers | 152/209 R |
| 4,379,501 | 4/1983 | Hagiwara et al. | 188/218 XL |

*Primary Examiner*—Bruce H. Stoner, Jr.
*Assistant Examiner*—Robert J. Oberleitner
*Attorney, Agent, or Firm*—Barnes, Kisselle, Raisch, Choate, Whittemore & Hulbert

[57] ABSTRACT

A ventilated disc brake rotor in which spacing between and/or radial length of cooling fins are varied around the rotor for frequency and/or amplitude modulated damping of vibration harmonics, and for balancing the rotor.

51 Claims, 11 Drawing Figures

BRAKE ROTOR WITH VIBRATION HARMONIC SUPPRESSION, AND METHOD OF MANUFACTURE

The present invention is directed to brake rotors and methods of manufacture, and more particularly to a ventilated disc brake rotor structured for suppression of harmonic vibration during braking.

Vibration of a brake rotor during brake operation can cause a loud and irritating "squeal" if permitted to resonate at audible harmonic frequencies. This problem can occur with conventional drum and disc brake systems. Prior art attempts to address this problem have included the use of sound deadening inserts or fillers in the rotor (drum or disc) structure, and special material compositions in the rotor and/or brake pad. In the specific environment of ventilated disc brake rotors, the Day U.S. Pat. No. 3,298,476 and Hagiwara et al No. 4,379,501 disclose techniques for varying the pattern of cooling fins around the rotor circumference to break up the vibration harmonic resonance patterns. In Day, the rotor circumference is divided into equal angular segments, and the spacing between cooling fins in each segment is random or non-repetitive. Hagiwara et al contemplates irregular or non-uniform spacing between and thickness of cooling fins around the rotor.

A general object of the present invention is to provide an improved technique for damping vibration harmonics, and thereby reducing irritating squeal, in both drum and disc brake rotors.

A further object of the invention is to provide a brake rotor with enhanced vibration damping capacity while maintaining desired balance, strength and thermal dissipation capacity.

Yet a further object of the invention is to provide a method of manufacturing such a rotor.

Another and more specific object of the invention is to provide a ventilated disc brake rotor which is structured to reduce or eliminate brake squeal.

The invention, together with additional objects, features and advantages thereof, will be best understood from the following description, the appended claims and the accompanying drawing in which:

Figure 1:
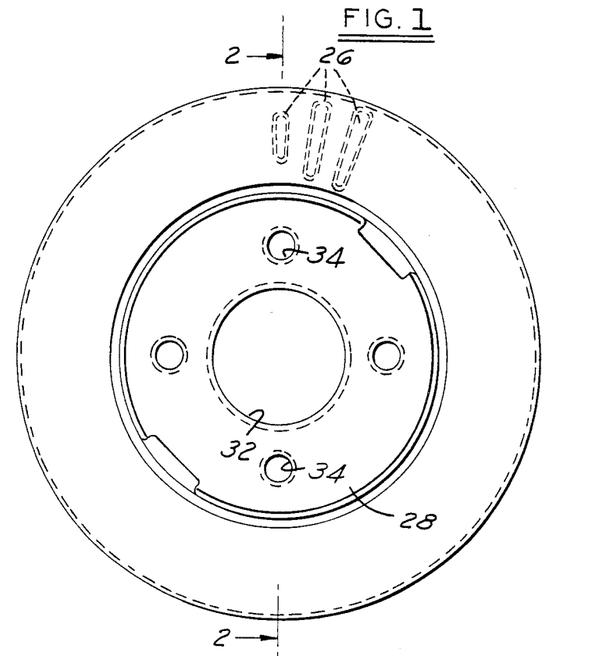
FIG. 1 is an axial elevational view of a ventilated disc brake rotor.
Figure 2:
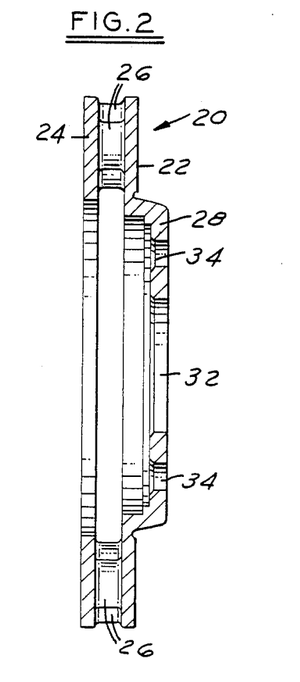
FIG. 2 is a sectional view taken along the line 2—2 in FIG. 1.

FIGS. 1 and 2 illustrate a ventilated disc brake rotor 20 as comprising a pair of flat annular friction rings or cheeks 22,24 spaced from each other by a circumferential array of radially extending angularly spaced ventilation fins 26. A central mounting surface 28 is integral with friction ring 22 and is provided with suitable apertures 32,34 for mounting rotor 20 on a vehicle. Rotor 20 may be of composite or one-piece cast construction of suitable composition. To the extent thus far described, rotor 20 is of conventional construction. In operation, rotor 20 is suitably mounted on a vehicle so that the axially facing surfaces of friction rings 22,24 may be selectively engaged by friction pads on one or more caliper assemblies (not shown) for slowing or braking an associated vehicle wheel. The present invention is directed to selective control of the length of and/or spacing between ventilation fins 26 for enhanced vibration damping during such braking operation by suppression of vibration-harmonic resonances. With harmonic resonances so suppressed, vibration energy is dissipated as "white noise", which is substantially unnoticed by vehicle occupants.

Figure 3:
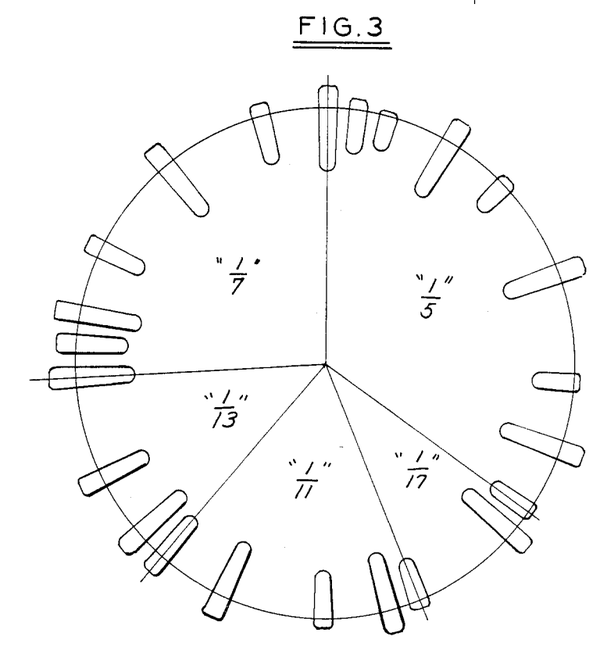
FIGS. 3-7 are schematic illustrations of circumferential patterns of disc ventilation fins in accordance with five presently preferred embodiments of the invention.
Figures 4, 5, 6:
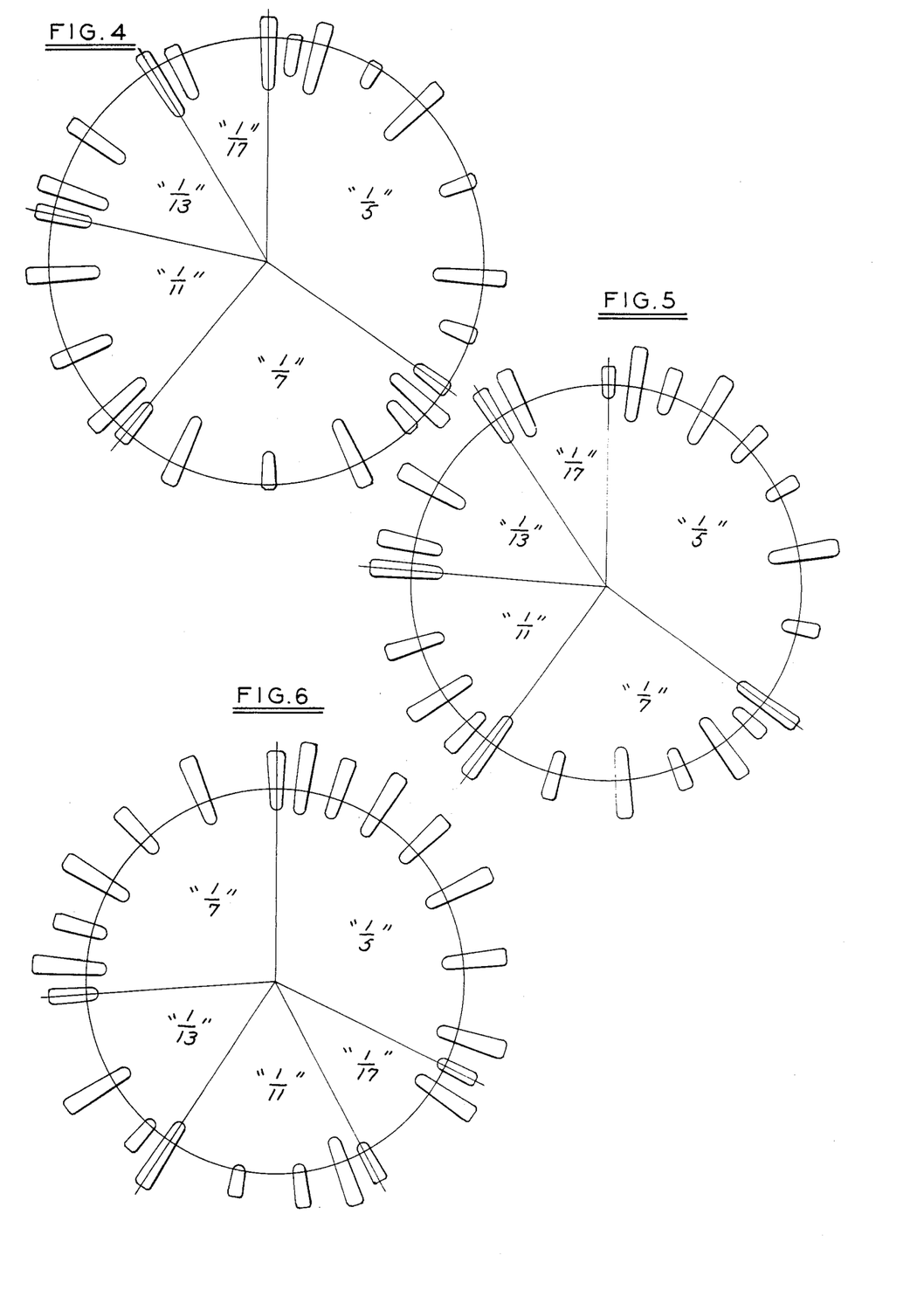
Figure 7:
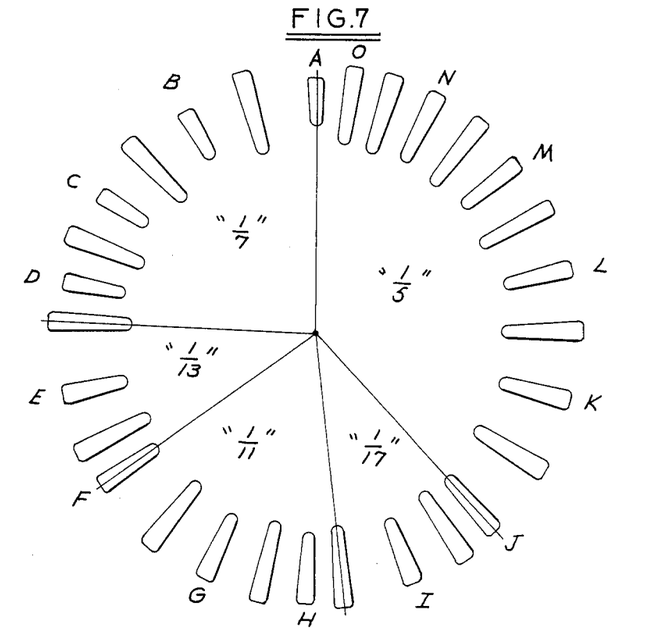

In general, in accordance with one important aspect of the present invention for frequency modulation of vibration harmonics a total number of fin cycles is selected, with each fin cycle consisting of a fin 26 and a space between that fin and the next-adjacent fin in the array. The circumferential array of fin cycles is then divided into a plurality of nominally unequal fractional angular segments. The nominal fractional size of the angular segments and the number of fin cycles in each segment are determined by modification of the techniques disclosed and claimed in the Landers U.S. Pat. No. 4,327,792 issued to The Goodyear Tire & Rubber Company, parent to the assignee of this application, in a manner to adapt the same for brake rotor applications in accordance with the principles of the present invention. The disclosure of this patent is incorporated herein by reference. The total number of fin cycles in the circumferential array, the number of fractional segments and the nominal fractional size of each fractional array segment preferably are prime numbers in accordance with the present invention. The sequence of fractional angular segments in the circumferential fin array is in non-sequential order by size in the embodiments of FIGS. 3, 6 and 7 of the present disclosure, or is in order of increasing segment size (FIGS. 4 and 5). The angular dimension and sequence of the fin cycles in each segment are in cyclic patterns within each segment in the embodiments of FIGS. 3 and 4 so that the wavelength of the predominant vibration frequency for each segment substantially corresponds to the circumferential length of that segment, or in non-cyclic and non-repetitive progressively increasing patterns within each segment (FIGS. 5, 6 and 7). This nominally unequal segmentation of and selected spacing between ventilation fins so modulates the frequencies of vibration as to suppress harmonic resonances.

In accordance with a second important aspect of the invention disclosed herein, radial lengths of the ventilation fins are also selected and controlled to modulate and dampen the amplitude of vibration, and to balance the rotor about its axis of rotation. This is accomplished by locating the center of gravity of a particular rotor design assuming that all fins are of equal length, and then shortening the fin length at alternate fin positions around the entire array as an exponential function of angle.

More specifically, in providing a ventilated disc brake rotor in accordance with the principles of the present invention, the number of cooling fins and the limits of angular spacing between fins are normally dictated by mechanical strength and manufacturing capabilities. That is, the desired number of fins and the maximum allowable spacing between fins are selected to obtain desired strength and rigidity in the overall structure under worst-case stress and temperature conditions. In accordance with an important feature of the preferred embodiments of the invention (FIGS. 3-7), the number of fins is selected to be a prime number. In the embodiments of FIGS. 3–6, twenty-three fins are illustrated. In the embodiment of FIG. 7, twenty-nine fins are employed. The embodiments of FIGS. 3–7 (and FIG. 10) find particular application in 220 mm OD automotive passenger car disc brake rotors. The minimum spacing between fins is typically dictated by manufacturing capabilities. A maximum spacing of 1.75 inches (44.45 mm) and a minimum spacing of 0.25 to 0.5 inches (6.35 to 12.7 mm), measured in the circumferential direction, have been found suitable in automotive passenger car applications.

As a next step in provision of the preferred embodiments of the invention (FIGS. 3–7), the circumferential dimension of the fin array is divided into fractional segments. In accordance with the preferred technique of the present invention, prime numbers are employed where selection permits. Such use of prime numbers is considered to enhance the frequency modulation feature of the invention. Thus, the number of segments is preferably a prime number, five in the embodiments of FIGS. 3–7. Likewise, a nominal fraction associated with each segment is selected such that the fraction denominators are prime numbers. Thus, in FIGS. 3–7, the fractional angular segments nominally comprise segments of 1/5, 1/7, 1/11, 1/13 and 1/17. It will be noted that the segment fractions sum to 0.57, which is substantially less than unity.

The number of fin cycles within each segment is then determined as a function of the total number of fin cycles multiplied by the ratio of the nominal fraction for each segment to the sum of all segment fractions. Thus, the number of cycles in the "1/5" segment of FIG. 3 is a function of the total number of fins (23) multiplied by the ratio of the segment fraction (1/5) to the sum of all fractions (0.57).

More specifically, for the embodiments of FIGS. 3–6, selection of the number of fin cycles within each fractional segment proceeds per the following table:

TABLE I

| Nominal Segment Fractions (X) | X-Multiplier Base (Y) | Adjusted Segment Fractions (Z = Y/Fraction Base) | Number of Cycles/Segment (Z × 23) | Round Off |
| --- | --- | --- | --- | --- |
| 1/5 | 17017 | .35 | 8.05 | 8 |
| 1/7 | 12155 | .25 | 5.75 | 6 |
| 1/11 | 7735 | .16 | 3.68 | 4 |
| 1/13 | 6545 | .14 | 3.22 | 3 |
| 1/17 | 5005 | .10 | 2.3 | 2 |
|  | 48457 |  |  | 23 |

First, a "multiplier base" is found by multiplying the denominators of the nominal segment sizes. This base is 85085 in the example given. The nominal segment sizes (X in column 1) are then each multiplied by the base (85085), and the results added in column 2 to arrive at a common fraction base (48457). The figures of column 2 (Y) are then divided by the fraction base to arrive at the adjusted fraction or decimals (Z) in column 3 associated with each segment. These adjusted segment fractions are then multiplied by the total selected number of fin cycles (23) and rounded off to arrive at the number of "cycles" per segment in column 5.

For the embodiment of FIG. 7, the last steps of the foregoing procedure are varied slightly, per the following table:

TABLE II

| Nominal Segment Size (X) | Adjust Segment (Size Z) | Cycles/Segment (Z × 29) | Round off to Closest Prime No. |
| --- | --- | --- | --- |
| 1/5 | .35 | 10.2 | 11 |
| 1/7 | .25 | 7.3 | 7 |
| 1/11 | .16 | 4.6 | 5 |
| 1/13 | .14 | 3.9 | 3 |
| 1/17 | .10 | 2.9 | 3 |
|  |  |  | 29 |

That is, the number of fin cycles per segment is rounded off to the closest prime number in the embodiment of FIG. 7, rather than to the closest number as in the embodiment of FIGS. 3–6. Note that this results in one extra cycle in the 1/5 nominal segment, and one less cycle in the 1/13 nominal segment. Again, this design decision is in keeping with the general consideration in accordance with the preferred aspects of the invention to employ prime numbers wherever possible.

The next step in providing the preferred embodiments of the invention (FIGS. 3–7) is to determine the sequence of fractional segments around the fin array. In the embodiments of FIGS. 3, 6 and 7, the segments are arranged in non-sequential order by size—i.e., in the order 1/5, 1/17, 1/11, 1/13, 1/17 in the clockwise direction in FIGS. 3, 6 and 7. In the embodiments of FIGS. 4 and 5, the order of decreasing segment size is employed—i.e., 1/5, 1/7, 1/11, 1/13, 1/17.

The size and sequence of fin cycles within each segment must then be determined. In all preferred embodiments of the invention, all fins 26 are of equal angular dimension. Thus, size of the fin cycles is varied by varying the size or angular dimension of the space between the fin of one fin cycle and the fin of the next-adjacent fin cycle. In general, the size and sequence of fin cycles in the embodiments of FIGS. 3–7 are selected as a predetermined junction of angle within each segment.

More specifically, in the embodiments of FIGS. 3 and 4, the size and sequence of fin cycles within each segment are arranged so that the wavelength of the predominant vibration frequency for that segment substantially corresponds to the circumferential length of that segment. This is illustrated by the following table:

TABLE III

| Nominal Segment Size | Number of Cycles (Table II) | Cycle Dimension Sequence |
| --- | --- | --- |
| 1/5 | 8 | AABBCCBB |
| 1/7 | 6 | AABCCB |
| 1/11 | 4 | ABCB |
| 1/13 | 3 | ABC |
| 1/17 | 2 | AC |

The dimension "A" is the minimum spacing between fins, or 0.5 inches (12.7 mm) in the embodiments discussed. The dimension "C" is the maximum spacing between fins, or 1.75 inches (44.45 mm) in the embodiments discussed. The dimension "B" is halfway between "A" and "C", or 1.125 inches (28.575 mm) in these embodiments.

In the embodiments of FIGS. 5–7, the fin cycles within each segment are arranged in sequential order by length, with the lengths of the successive inter-fin spaces increasing at uniform increments substantially between the minimum and maximum design limits. Specifically, the first inter-fin space in each segment of these embodiments (in clockwise order) is selected to be the minimum design (0.5 inches or 12.7 mm), and the last space in each segment is initially assumed to be at the maximum design dimension (1.75 inches or 44.45 mm). The intervening spaces are then dimensioned to increase uniformly from minimum to maximum. For example, the inter-fin spacings in the embodiments of FIGS. 5 and 6 are given by the following table:

TABLE IV

| Nominal Segment Fraction | Inter-fin Spacing Sequence (in inches) | Increment (inches) |
|---|---|---|
| 1/5 | ½, 21/32, 13/16, 31/32, 1 1/16, 1 9/32, 1 7/16, 19/32 | 5/32 |
| 1/17 | ½, 45/64, 29/32, 1 7/64, 1 5/16, 1 23/64 | 13/64 |
| 1/11 | ½, 1 3/16, 1⅛, 1 7/16 | 5/16 |
| 1/13 | ½, 1⅛, 1¾ | ⅝ |
| 1/7 | ½, 1¾ | — |

It will be noted that it is not always possible using simple fractional increments to have the last space equal to the maximum dimension. The spacing dimensions and sequence within each segment in the embodiment of FIG. 7 is determined in an analogous manner.

In accordance with a second important aspect of the invention, rotor balance about its axis of rotation is obtained, and amplitude modulation (damping) of the vibration harmonics is also accomplished, by varying the length of alternate fins—i.e., every other fin—as a function of angle around the array. More specifically, the radial dimension or length of alternate fins is shortened or decreased from the length of the intermediate fins (which are at equal length) as an exponential fuction of angle around the fin array. The procedure employed will be described in detail in connection with the embodiment of FIG. 7, with it being understood that the embodiments of FIGS. 3-6 are designed in an analogous fashion (as is the embodiment of FIG. 10 to be described).

Figure 9:
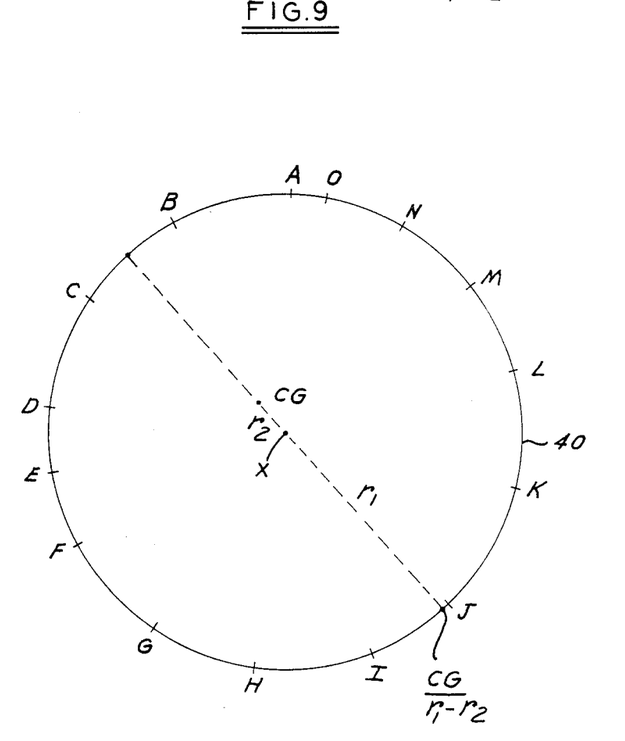

FIG. 9 illustrates alternate fins A-O in the embodiment of FIG. 7 distributed around the circle 40, which is at a radius r from the rotor axis x corresponding to the radius of the weight-center of the fins. After the locations and spacing of the several fins have been determined per the foregoing discussion, the center of gravity CG and the location and amount of unbalance associated with the center of gravity CG are determined either analytically or empirically. A straight line passing through CG and x intersects circle 40 at the point $CG/(r_1-r_2)$, which represents the point at which weight must be removed, and the amount of weight which must be removed, to balance the rotor.

Figure 8:
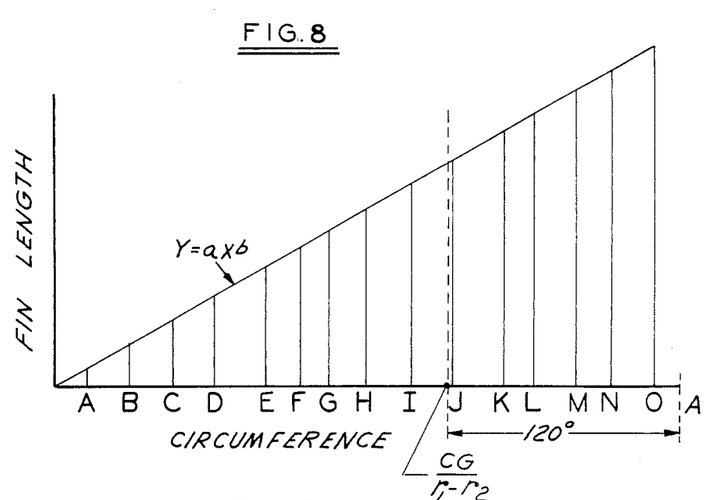
FIGS. 8 and 9 are graphic illustrations useful in understanding one aspect of the invention.

FIG. 8 graphically illustrates the amount of material which must be "removed" from alternate fins A-O in order to balance the rotor and at the same time provide the desired vibration amplitude modulation previously described. In FIG. 8, the abscissa is in degrees around circle 40, with the relative locations of fins A-O being placed accordingly. The ordinate of FIG. 8 represents the amount by which each fin A-O is to be foreshortened as compared with the intervening fins, which are all of identical length. The angle of point $CG/r_1-r_2$, which fell next to fin J in FIG. 9, is placed in FIG. 8 at a position corresponding to an angle of 120° from the shortest fin—i.e. fin A. In accordance with this aspect of the present invention, the length of alternate fins A-O is then determined as a function of the exponential equation $y=ax^b$ in FIG. 8, where y is fin length, x is angle in radians, and a and b are constants. As a starting point, b is made equal to unity. However, it has been found necessary in practice of the invention to vary the constant b upwardly or downwardly from unity because of the limited number of fins.

In one example of the invention in accordance with the embodiment of FIG. 7, the nominal fin length is 1.44 inches, and the lengths, of alternate fins A-O are given in inches by the following table:

TABLE V

| Fin | Length (inches) |
|---|---|
| A | 0.82 |
| B | 0.91 |
| C | 0.99 |
| D | 1.09 |
| E | 1.12 |
| F | 1.17 |
| G | 1.21 |
| H | 1.22 |
| I* | 1.21 |
| J | 1.25 |
| K* | 1.24 |
| L* | 1.22 |
| M* | 1.24 |
| N | 1.28 |
| O | 1.34 |

It will be noted that several fins designated by the asterisk (*) are not in sequential order by length. Because of the limited number of fins, it is sometimes possible only to approximate balance by the foregoing method. The lengths of individual fins are then selectively varied to bring the rotor into balance, while still maintaining a substantially exponential length function as previously described. It will also be noted that, because an odd number of fins are employed, adjacent fins A and O are foreshortened.

Figure 10:
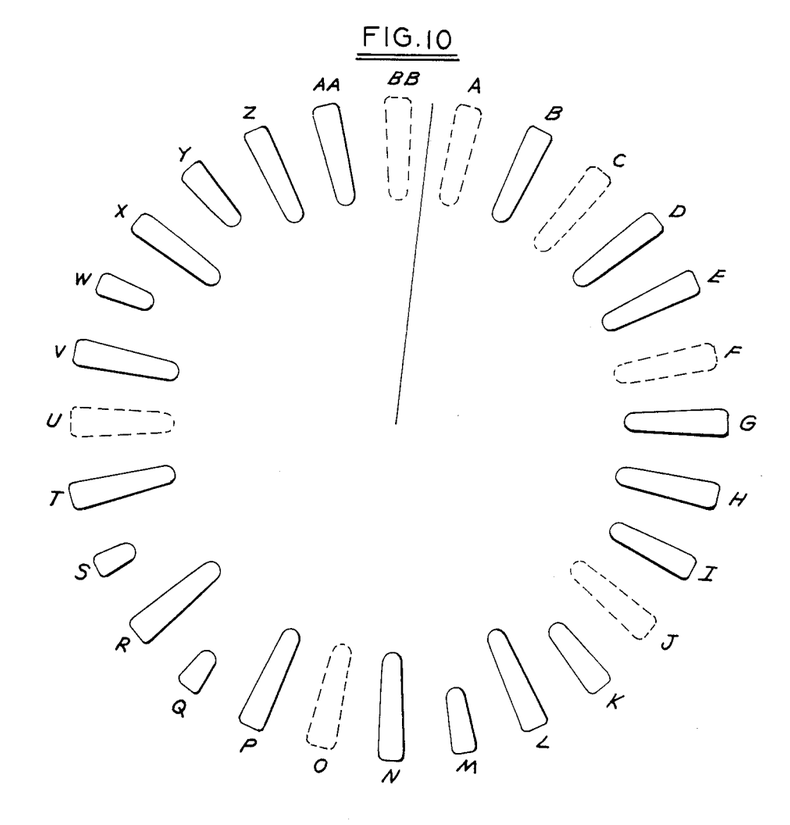
FIG. 10 is a schematic illustration of another disc brake fin pattern in accordance with the invention.
Figure 11:
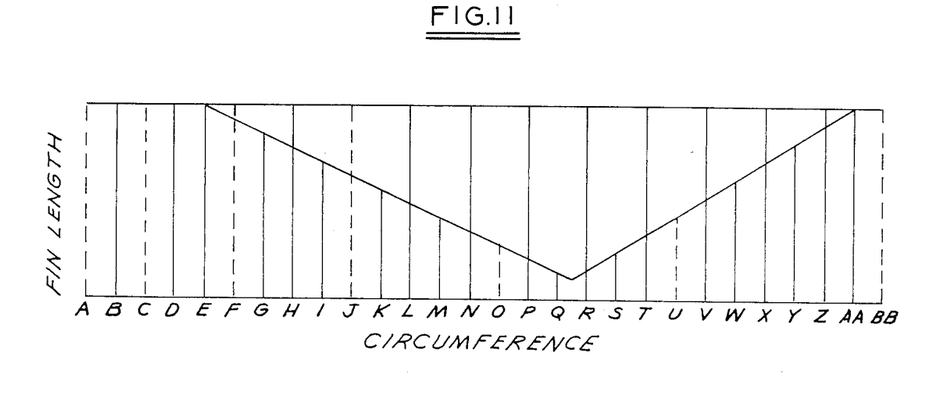
FIG. 11 is a graphic illustration useful in explaining the structure of FIG. 10.

FIG. 10 illustrates a ventilation fin pattern in accordance with another embodiment of the present invention. In the embodiment of FIG. 10, the design begins with a uniformally spaced array of fin locations, in this case twenty-eight loctions A-BB. Fins are then deleted or left out of locations at spacings which increase stepwise around the array. That is, one fin at location B separates "empty" locations A and C, two fins at locations D and E separate "empty" locations C and F, etc. This staggered location of empty fin locations inhibits reinforcement of vibration harmonics. To obtain amplitude modulation, and to balance the rotor, the fins at alternating locations are foreshortened as an exponential function of angle as shown in FIG. 11, starting with fin location E and proceeding around the array to fin location BB. (It will be appreciated that there are no fins at locations F, J, D and U to be shortened.). The fins in the embodiment of FIG. 10 have equal angular dimension.

Ventilated disc brake rotors having the configuration of FIG. 10 have been constructed and compared in terms of vibration damping to a disc brake rotor of conventional construction and identical size and composition. The conventional rotor employed for comparison purposes is used on the Chrysler K car and embodies 28 equally spaced fins of identical angular dimension. The radial dimension of the fins alternate between long and short around the array, with all long fins being of equal length and all short fins being of equal length. The damping coefficient for the conventional rotor was between 0.25 and 0.29, while the damping coefficient of the embodiment of FIG. 10 was 0.60.

Thus, a first important aspect of the present invention, disclosed in connection with FIGS. 3-7, contemplates a method of manufacturing brake rotors wherein a circumferential array of cooling ribs or fins is divided into a plurality of unequal nominal fractional segments. Preferably, the number of fins, the number of segments and the nominal segment fractions are prime numbers. The actual size of each fractional segment in terms of the number of inter-fin spaces disposed therein is then determined as a function of the ratio of segment of fraction to the numerical sum of all segment fraction and rounded off to the closest number (FIGS. 3-6) or to the closest prime number (FIG. 7). Note that application of the latter technique in the embodiment of FIG. 7 resulted in equality of actual array fractional segments, even though nominal fractional segments were unequal, i.e., the 1/13 and 1/17 nominal segments, because of the limited number of fins and inter-fin spaces in the overall array. The sequence of fractional segments is in non-sequential order by size (FIGS. 3, 6 and 7) or in order of decreasing size (FIGS. 4 and 5). The sizes and sequence of spaces within each array segment are in a substantially cyclic pattern having a pattern wavelength which substantially corresponds to the circumferential length of the associated segment (FIGS. 3 and 4), or are in a sequential incrementally increasing pattern between design minimum and maximum limits (FIGS. 5-7).

In accordance with a second aspect of the present invention, which is preferably used in combination with the first aspect as described in detail in connection with FIGS. 7-9, but may also be employed separately per FIGS. 10 and 11, the length of the fins at alternate fin positions is varied as an exponential function of angle around the array.

In accordance with a third aspect of the invention described in connection with FIG. 10, fin locations are uniformly spaced or positioned around the rotor, and fins are selectively deleted at location spacings which increase step-wise around the array.

The first and third aspects of the invention, which provide inter-fin spaces at psuedo-random locations and/or of psuedo-random dimension, achieve frequency-modulated damping or suppression of vibration harmonics in the rotor. Selective foreshortening at alternating fin locations as a function of angle around the array obtains amplitude modulation of vibration harmonics, and also is employed to balance the rotor.

It will be appreciated that, although the invention has been disclosed in detail in connection with ventilated disc brake rotors, the principles of the invention find equal application in the manufacture of drum brake rotors—i.e. brake drums—wherein spacing between and/or axial length of cooling fins around the drum periphery may be varied to obtain reduced brake squeal in accordance with the invention.

I claim:

1. A method of manufacturing a brake rotor which includes at least one braking surface and a circumferential array of cooling fins, said method comprising the steps of:
   (a) selecting a total number of fin cycles in said array, each said fin cycle consisting of a fin and a space between the said fin and the next-adjacent fin in said array,
   (b) dividing said array into a plurality of unequal nominal fractional angular segments,
   (c) arranging said nominal fractional angular segments in a predetermined sequence around said array,
   (d) selecting the number of fin cycles in each said segment as a function of said total number of fin cycles multiplied by the ratio of the corresponding said nominal fractional segment to the numerical sum of said nominal fractional segments, and
   (e) selecting the angular dimension of each said fin cycle within each said segment as a predetermined function of sequence of fin cycles within the corresponding said segment.

2. The method set forth in claim 1 wherein said total number of fin cycles selected in said step (a) is a prime number.

3. The method set forth in claim 2 wherein said total number is 23.

4. The method set forth in claim 2 wherein said total number is 29.

5. The method set forth in claim 2 wherein the number of segments into which said array is divided in said step (b) is a prime number.

6. The method set forth in claim.2 wherein said number of segments is 5.

7. The method set forth in claim 2 wherein the nominal fractional size of each said nominal fractional angular segment is a prime number.

8. The method set forth in claim 7 wherein said nominal fractional sizes comprise 1/5, 1/7, 1/11, 1/13 and 1/17.

9. The method set forth in claim 1 wherein said step (c) comprises the step of arranging said segments in size sequence around said array.

10. The method set forth in claim 1 wherein said step (c) comprises the step of arranging said segments in non-sequential order by size around said array.

11. The method set forth in claim 1 wherein the total number of fin cycles within each segment selected in said step (d) is a prime number.

12. The method set forth in claim 1 wherein said step (e) comprises the step of arranging said fin cycles by length within each said segment so that the wavelength of the predominant vibration frequency of each said segment substantially corresponds to the circumferential length of that segment.

13. The method set forth in claim 12 wherein said step (e) comprises the steps of (e1) selecting a predetermined number of differing fin cycle lengths equal to preselected maximum and minimum cycle lengths and at least one cycle length between said maximum and minimum lengths, and (e2) arranging said cycle lengths in substantially a cyclic sequence within each said segment, said sequence completing one cycle within each said sequence.

14. The method set forth in claim 1 wherein said step (e) comprises the step of arranging said fin cycles in sequential order by length within each said segment.

15. The method set forth in claim 14 wherein said step (e) comprises the steps of (e1) selecting minimum and maximum lengths for said fin cycles, and (e2) varying cycle length within each said segment at uniform increments substantially between said minimum and maximum lengths.

16. The method set forth in claim 1 wherein all of said fins are of equal angular dimension.

17. The method set forth in claim 16 comprising the additional step of (f) varying radial length of selected ones of said fins, the remaining said fins being of equal length.

18. The method set forth in claim 17 wherein said step (f) comprises the step of varying radial length of alternate ones of said fins.

19. The method set forth in claim 18 wherein said step (f) comprises the step of varying radial length of alternate ones of said fins as a function of angle around said array.

20. The method set forth in claim 19 wherein said step (f) comprises the step of varying radial length of alternate ones of said fins substantially as an exponential function of angle around said array.

21. In a brake rotor which includes annular brake surface means adapted to be engaged by a brake element and a plurality of fins disposed in a circumferential array and coupled for heat dissipation to said brake surface means, a method of suppressing harmonic vibrations by frequency modulation comprising the steps of:
   (a) selecting a total number of fins in said array equal to a prime number, with each said fin having equal angular dimension,
   (b) dividing said array into a prime number of unequal nominal fractional angular segments,
   (c) selecting the number of inter-fin spaces in each said segment as a function of the ratio of the corresponding segment nominal fraction to the numerical sum of all segment nominal fractions, and
   (d) selecting the angular dimension of the inter-fin spaces within each said segment as a predetermined function of angle within each said segment.

22. The method set forth in claim 21 wherein the number of inter-fin spaces selected in said step (c) is a prime number.

23. The method set forth in claim 21 comprising the additional step of suppressing harmonic vibrations of said rotor by amplitude modulation, and at the same time balancing said rotor about its axis of rotation, by (e) varying radial length of alternate ones of said fins substantially as an exponential function of angle around said array, the remainder of said fins all being of equal length.

24. In a method of manufacturing a brake rotor comprising a brake surface and a circumferential array of cooling fins, the improvement for frequency modulating harmonic vibrations comprising the steps of:
   (a) defining a plurality of evenly spaced fin positions around said array, and
   (b) arranging said cooling fins at selected first ones of said positions while leaving fins absent from selected second ones of said positions, with the number of fin positions between said second ones of said positions increasing stepwise around said array.

25. In the method set forth in claim 24, the further improvement for amplitude modulating said harmonic vibrations comprising the step of:
   (a) varying radial length of fins located at alternate ones of said fin positions around said array, the remainder of said fins being of equal length.

26. The method set forth in claim 25 wherein said step (c) comprises the step of varying radial length of said fins at said alternate positions substantially as an exponential function of angle around said array.

27. In a brake rotor which includes annular brake surface means adapted to be engaged by a brake element and a plurality of fins disposed in a circumferential array at predetermined angularly spaced positions and coupled for heat dissipation to said brake surface means, a method of suppressing harmonic vibrations in said rotor comprising the step of (a) selectively controlling radial length of fins at alternate ones of said fin positions to decrease substantially progressively in length as a predetermined function of angle around said array, the fins at the remainder of said positions being of uniform equal radial dimension.

28. The method set forth in claim 27 wherein said predetermined function is a substantially linear function.

29. The method set forth in claim 28 comprising the additional steps of:
   (b) selecting a total number of fins in said array equal to a prime number, with each said fin having equal angular dimension,
   (c) dividing said array into a prime number of unequal nominal fractional angular segments,
   (d) selecting the number of inter-fin spaces in each said segment as a function of the ratio of the corresponding segment nominal fraction to the numerical sum of all segment nominal fractions, and
   (e) selecting the angular dimension of the inter-fin spaces within each said segment as a predetermined function of angle within each said segment.

30. The method set forth in claim 28 comprising the additional steps of:
   (b) defining a plurality of evenly spaced fin positions around said array, and
   (c) arranging said cooling fins at selected first ones of said positions while leaving fins absent from selected second ones of said positions, with the number of fin positions between said second ones of said positions increasing stepwise around said array.

31. A brake rotor comprising means providing an annular braking surface and a circumferential array of cooling fins coupled for heat dissipation to said braking surface means, said array of fins consisting of a preselected number of fin cycles each defined by a single fin and a space between said single fin and the next-adjacent fin in said array, said fin cycles being grouped in a plurality of nominal fractional angular segments, with the number of fin cycles in each of said segments being a predetermined function of the ratio of the corresponding segment nominal fraction to the numerical sum of all segment nominal fractions, the angular dimension of each fin cycle within each said segment being a predetermined function of angle within the corresponding said segment.

32. The rotor set forth in claim 31 wherein said total number of fins is prime number.

33. The rotor set forth in claim 31 wherein said total number is 23.

34. The rotor set forth in claim 31 wherein said total number is 29.

35. The rotor set forth in claim 31 wherein the number of segments in which said array is divided is a prime number.

36. The rotor set forth in claim 31 wherein said number of segments is 5.

37. The rotor set forth in claim 31 wherein the nominal fractional size of each said nominal fractional angular segment is a prime number.

38. The rotor set forth in claim 37 comprising a disc brake rotor having a pair of axially spaced annular braking surface means separated and integrally connected by said fins.

39. The rotor set forth in claim 38 said nominal fractions comprise 1/5, 1/7, 1/11, 1/13 and 1/17.

40. The rotor set forth in claim 31 wherein said segments are disposed in sequence by size around said array.

41. The rotor set forth in claim 31 wherein the total number of fin cycles within each said segment is a prime number.

42. The rotor set forth in claim 31 wherein said fin cycles are arranged by length within each segment so that the wavelength of the predominant vibration frequency of each said segment substantially corresponds to the circumferential length of that segment.

43. The rotor set forth in claim 42 wherein said fin cycles are arranged within each said segment in a substantially cyclic sequence completing one cycle within said length of that segment.

44. The rotor set forth in claim 31 wherein said fin cycles are in sequence by length within each said segment.

45. The rotor set forth in claim 44 wherein said fin cycles within each said segment are sequential by length at uniform increments substantially between preselected minimum and maximum lengths.

46. The rotor set forth in claim 31 wherein all of said fins are of equal angular dimension.

47. The rotor set forth in claim 46 wherein radial length of alternate ones of said fins vary as a preselected function of angle around said array, the remainder of said fins being of equal length.

48. The rotor set forth in claim 47 wherein said preselected function is an exponential function.

49. In a brake rotor comprising annular brake surface means and a plurality of cooling fins disposed at preselected fin positions in a circumferential array around said rotor and coupled for heat dissipation to said means, the improvement for reducing harmonic vibration of said rotor wherein the said cooling fins at alternate ones of said positions are of progressively reduced radial dimension as compared with the remainder of said fins, which are of equal length, as a substantially exponential function of angle around said array.

50. The rotor set forth in claim 49 wherein said fin positions are at uniform spacing around said array, and wherein fins are absent from selected ones of said positions separated from each other by spacing increments which increase step-wise around said array.

51. The rotor set forth in claim 49 wherein said array of fins consists of a preselected number of fin cycles each defined by a single fin and a space between said single fin and the next-adjacent fin in said array, said fin cycles being grouped in a plurality of nominal fractional angular segments, with the number of fin cycles in each of said segments being a predetermined function of the ratio of the corresponding segment nominal fraction to the numerical sum of all segment nominal fractions, the angular dimension of each fin cycle within each said segment being a predetermined function of angle within the corresponding said segment.

* * * * *